(12) United States Patent
Matsuo

(10) Patent No.: US 11,351,915 B2
(45) Date of Patent: Jun. 7, 2022

(54) STEERING WHEEL

(71) Applicant: JOYSON SAFETY SYSTEMS JAPAN K.K., Tokyo (JP)

(72) Inventor: Hiromi Matsuo, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 0 days.

(21) Appl. No.: 16/981,937

(22) PCT Filed: Mar. 28, 2019

(86) PCT No.: PCT/JP2019/013517
§ 371 (c)(1),
(2) Date: Sep. 17, 2020

(87) PCT Pub. No.: WO2019/208085
PCT Pub. Date: Oct. 31, 2019

(65) Prior Publication Data
US 2021/0031684 A1    Feb. 4, 2021

(30) Foreign Application Priority Data

Apr. 26, 2018   (JP) .............................. JP2018-085828

(51) Int. Cl.
*B60Q 5/00* (2006.01)
*B60R 21/203* (2006.01)
*B62D 1/04* (2006.01)

(52) U.S. Cl.
CPC ............ *B60Q 5/003* (2013.01); *B60R 21/203* (2013.01); *B62D 1/04* (2013.01)

(58) Field of Classification Search
CPC ... B60Q 5/003; B60R 21/203; B60R 21/2037; B62D 7/222; B62D 1/04; B62D 1/11
See application file for complete search history.

(56) References Cited

U.S. PATENT DOCUMENTS

| 8,256,797 B2 | 9/2012 | Sakurai et al. |
| 8,733,203 B2 | 5/2014 | Kondo et al. |

(Continued)

FOREIGN PATENT DOCUMENTS

| DE | 10 2009 040 303 A1 | 3/2010 |
| DE | 10 2013 002 557 A1 | 8/2014 |

(Continued)

OTHER PUBLICATIONS

International Searching Authority, "International Search Report," issued in connection with International Patent Application No. PCT/JP2019/013517, dated Jul. 2, 2019.

(Continued)

*Primary Examiner* — Laura Freedman
(74) *Attorney, Agent, or Firm* — Foley & Lardner LLP

(57) ABSTRACT

Provided are a horn switch and steering wheel capable of reducing a space for the horn switch. A horn switch 4 includes: a guide pin 41 provided with a first end part 411 axially slidably connected to a first opening 211 of a core metal 2, and a second end part 412 disposed to be locked to a second opening 322 of an airbag module 3; a stopper 42 provided with a flange part 421 fixed to the shaft part of the guide pin 41; a damper 43 disposed in a space between the second end part 412 and the flange part 421 and locked to the inner edge of the second opening 322; a horn spring 45 disposed between the flange part 421 and the core metal 2; a fixed-side contact 46 disposed in the core metal 2; and a movable-side contact 47 disposed in the airbag module 3.

8 Claims, 7 Drawing Sheets

(56) References Cited

U.S. PATENT DOCUMENTS

| | | | |
|---|---|---|---|
| 9,403,552 B2* | 8/2016 | Onohara | B60R 21/2037 |
| 10,023,221 B2* | 7/2018 | Obayashi | B60Q 5/003 |
| 10,377,335 B2* | 8/2019 | Ishii | B60R 21/2035 |
| 2009/0218739 A1 | 9/2009 | Terada et al. | |
| 2010/0066062 A1 | 3/2010 | Suzuki et al. | |
| 2011/0120258 A1 | 5/2011 | Kondo et al. | |
| 2013/0221641 A1 | 8/2013 | Kondo et al. | |
| 2013/0239739 A1 | 9/2013 | Miyahara et al. | |
| 2014/0306432 A1 | 10/2014 | Obayashi et al. | |
| 2016/0031399 A1 | 2/2016 | Andersson | |
| 2016/0031480 A1 | 2/2016 | Ishii et al. | |
| 2017/0036687 A1 | 2/2017 | Obayashi et al. | |
| 2017/0088171 A1 | 3/2017 | Ishii et al. | |
| 2017/0144594 A1 | 5/2017 | Obayashi | |

FOREIGN PATENT DOCUMENTS

| | | |
|---|---|---|
| DE | 10 2015 009 882 A1 | 2/2016 |
| EP | 2 085 290 B1 | 8/2009 |
| JP | S57-157569 U | 10/1982 |
| JP | 2009-202859 A | 9/2009 |
| JP | 2010-069934 A | 4/2010 |
| JP | 2011-110941 A | 6/2011 |
| JP | 2012-158236 A | 8/2012 |
| JP | 2015-145173 A | 8/2015 |
| JP | 2015-160438 A | 9/2015 |
| JP | 2016-199183 A | 1/2016 |
| JP | 2016-064808 A | 4/2016 |
| WO | WO-2012/032860 A1 | 3/2012 |
| WO | WO-2012/067131 A1 | 5/2012 |
| WO | WO-2013/077215 A1 | 5/2013 |
| WO | WO-2015/098224 A1 | 2/2015 |
| WO | WO-2016/002507 A1 | 1/2016 |
| WO | WO-2016/042850 A1 | 3/2016 |

OTHER PUBLICATIONS

International Searching Authority, "Written Opinion," issued in connection with International Patent Application No. PCT/JP2019/013517, dated Jul. 2, 2019.

* cited by examiner

STEERING WHEEL

CROSS-REFERENCE TO RELATED APPLICATIONS

The present application claims priority under 37 U.S.C. § 371 to International Patent Application No. PCT/JP2019/013517, filed Mar. 28, 2019, which claims priority to and the benefit of Japanese Patent Application No. 2018-085828, filed on Apr. 26, 2018. The contents of these applications are hereby incorporated by reference in their entireties.

TECHNICAL FIELD

The present invention relates to a steering wheel, and particularly to a steering wheel including a horn switch.

BACKGROUND ART

A steering wheel for operating a steering angle of a vehicle which is an automobile or the like generally includes a core metal that forms a skeleton of the steering wheel, an airbag module provided in a central part of the steering wheel, and a horn switch provided between the core metal and the airbag module (see, for example, Patent Literatures 1 and 2).

For example, Patent Literature 1 discloses a horn switch including a holder (a fixed side horn plate) fixed to the core metal and a bracket (a movable side horn plate) fixed to the airbag module, in which a guide shaft is fixed to the holder, and in which the bracket is provided movably along the guide shaft.

Patent Literature 2 discloses a horn switch including a fixing pin fixed to the core metal and a cap member fixed to the airbag module, in which the airbag module is provided movably along the fixing pin, in which a fixed side contact point is provided on the fixing pin, and in which a movable side contact point is provided on the cap member.

Patent Literature 1: JP2009-202859A
Patent Literature 2: JP2010-69934A

SUMMARY OF INVENTION

Since the airbag module is provided at the central part of the steering wheel, a space available for the horn switch is very narrow. However, in the invention described in Patent Literature 1, since the horn plate is used on both a fixed side and a movable side, it is necessary to secure a space for providing the horn plate.

In the inventions described in Patent Literatures 1 and 2, a guide pin (a guide shaft or a fixing pin) for guiding movement of the airbag module is fixed to a core metal side, and the airbag module is slid along the guide pin. Therefore, when the horn is operated, the airbag module is pushed down toward the core metal side, and accordingly, a front end of the guide pin protrudes toward an airbag module side.

When the guide pin and the airbag module interfere with each other at a time of horn operation, a large force may be required to ring the horn and a vibration damping effect of a damper provided in the horn switch may be reduced. Therefore, in the inventions described in Patent Literatures 1 and 2, it is necessary to secure a space where the front end of the guide pin can protrude without interfering with the airbag module side.

The present invention has been made in view of the above problems. An object of the present invention is to provide a steering wheel that can save a space for a horn switch.

According to an aspect of the present invention, there is provided a steering wheel configured to operate a steering angle of a vehicle. The steering wheel includes a core metal as a skeleton of the steering wheel, an airbag module provided on the steering wheel, and a horn switch provided between the core metal and the airbag module. The horn switch includes a guide pin including a first end portion that is axially slidably connected to a first opening provided in the core metal and a second end portion that is capable of being locked in a second opening provided in the airbag module, a stopper including a flange portion fixed to a shaft portion of the guide pin, a damper that is provided in a space between the second end portion and the flange portion and is locked to an inner edge of the second opening, a horn spring provided between the flange portion and the core metal, a fixed side contact point provided on the core metal, and a movable side contact point provided on the airbag module.

The stopper may include a plurality of protrusions provided on a contact surface of the flange portion with the damper.

The guide pin may be provided with a groove that is capable of being locked with an inner edge of the flange portion, and the stopper may include a cylindrical portion that extends from a lower surface of the flange portion along an axial direction of the guide pin.

The stopper may be provided with a cutout portion that divides the flange portion and the cylindrical portion into a plurality of parts in a circumferential direction. The stopper may include divided pieces obtained by dividing the flange portion and the cylindrical portion into a plurality of parts in a circumferential direction.

The horn switch may further include a substantially cylindrical guide sleeve provided in the first opening.

The horn switch may further include a protector provided between the second opening and the damper. The protector may include a plurality of protrusions provided on a contact surface of the protector with the damper.

The guide pin may include a reduced diameter portion capable of accommodating a part of a spring member provided on the core metal, and the reduced diameter portion has an axial length larger than a sliding distance of the guide pin.

Advantageous Effects of Invention

According to the above-described steering wheel in the present invention, since the guide pin is locked to the airbag module and is slidably provided on the core metal, it is possible to omit movable side and fixed side horn plates, and the guide pin does not protrude toward the airbag module when the horn switch operates. Therefore, it is not necessary to secure these spaces.

By providing the stopper on the shaft portion of the guide pin, a load applied when the airbag module is pushed can be reliably transmitted to the horn spring by the stopper. By locking the airbag module and the guide pin via the damper, the vibration frequency of the airbag module can be adjusted by the damper.

Therefore, according to the present invention, it is possible to save a space of the horn switch without impairing a function of the horn switch.

DESCRIPTION OF EMBODIMENTS

Figure 1A:
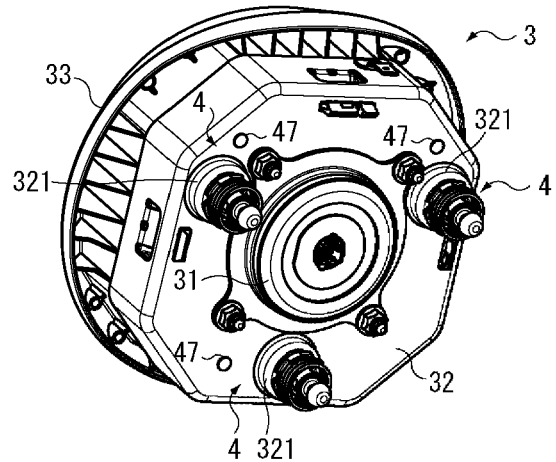
FIG. 1A is a view showing an airbag module of a steering wheel according to a first embodiment of the present invention.
Figure 1B:
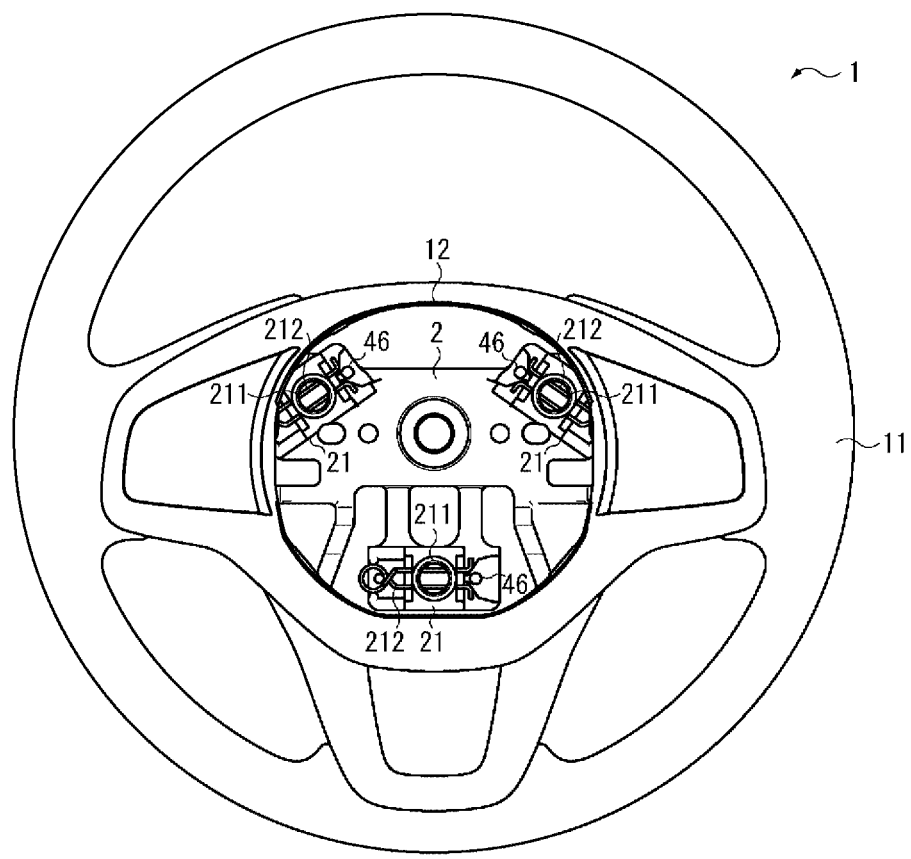
FIG. 1B is a view showing a steering wheel body of the steering wheel according to the first embodiment of the present invention.
Figure 2:
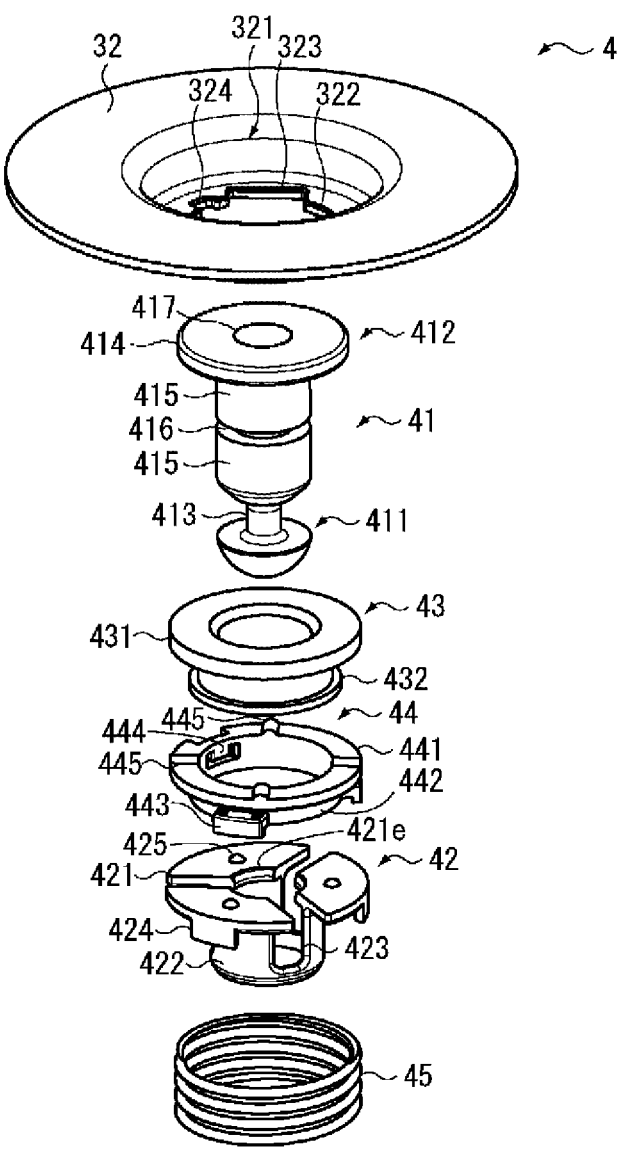
FIG. 2 is a component exploded view showing a horn switch shown in FIG. 1A.
Figure 3A:
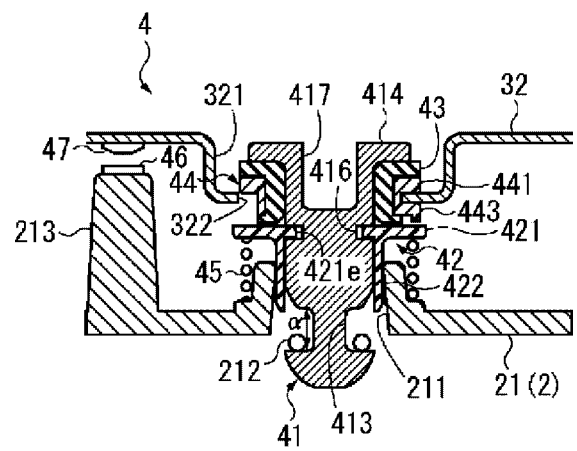
FIG. 3A is a cross-sectional view showing the horn switch shown in FIG. 1A in a normal state.
Figure 3B:
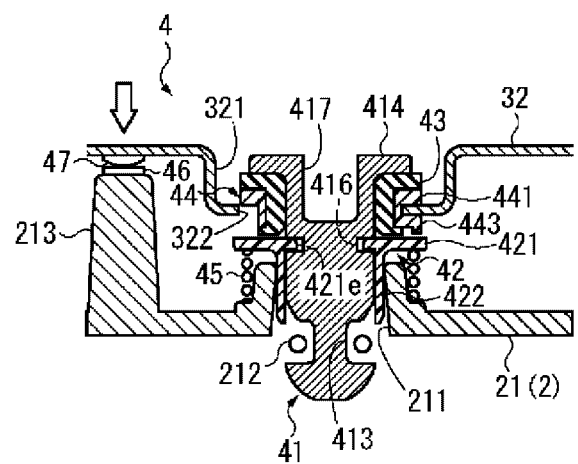
FIG. 3B is a cross-sectional view showing a horn switch shown in FIG. 1A in a horn operating state.

Embodiments of the present invention will be described below with reference to FIGS. 1A to 7B. Here, FIGS. 1A and 1B show a steering wheel according to a first embodiment of the present invention, more specifically, FIG. 1A shows an airbag module, and FIG. 1B shows a steering wheel body. FIG. 2 is a component exploded view showing a horn switch shown in FIG. 1A. FIGS. 3A and 3B are cross-sectional views showing the horn switch shown in FIG. 1A, more specifically, FIG. 3A shows a normal state of the horn switch, and FIG. 3B shows a horn operating state of the horn switch.

As shown in FIGS. 1A to 3A, a steering wheel 1 according to the first embodiment of the present invention includes a core metal 2 that forms a skeleton of the steering wheel 1, an airbag module 3 provided on the steering wheel 1, and a horn switch 4 provided between the core metal 2 and the airbag module 3. The horn switch 4 includes a guide pin 41 including a first end portion 411 that is axially slidably connected to a first opening 211 formed in the core metal 2 and a second end portion 412 that is capable of being locked in a second opening 322 formed in the airbag module 3, a stopper 42 including a flange portion 421 fixed to a shaft portion of the guide pin 41, a damper 43 that is provided in a space formed between the second end portion 412 and the flange portion 421 and is locked to an inner edge of the second opening 322, a protector 44 provided between the second opening 322 and the damper 43, a horn spring 45 provided between the flange portion 421 and the core metal 2, a fixed side contact point 46 provided on the core metal 2, and a movable side contact point 47 provided on the airbag module 3.

The steering wheel 1 is, for example, a component that is provided at a driver seat of a vehicle which is an automobile or the like and is configured to operate a steering angle of a wheel. As shown in FIG. 1B, a steering wheel body 11, which is in a state before the airbag module 3 is provided, is formed into a desired shape by molding a resin on an outer periphery of the core metal 2 formed of metal. A central part of the steering wheel body 11 is formed with an opening 12 configured to allow the airbag module 3 to be attached to the core metal 2.

The core metal 2 includes a plurality of pedestals 21 on which the airbag module 3 can be mounted. The pedestals 21 are provided at positions (here, three positions of 2 o'clock, 6 o'clock, and 10 o'clock when displayed by positions of a short hand of a clock) corresponding to the guide pin 41 of the horn switch 4. The pedestal 21 includes the first opening portion 211 through which the first end portion 411 of the guide pin 41 can be inserted, a spring member 212 provided below the first opening portion 211, and a convex portion 213 on which the fixed side contact point 46 is provided at an apex.

The spring member 212 is, for example, a bending spring formed by bending a wire to form two straight portions. By restraining front ends of a bent portion and the straight portion, an intermediate portion of the straight portion can be elastically deformed in a horizontal direction. As shown in FIGS. 1B and 3A, the two straight portions of the spring member 212 are bridged over the first openings 211. With this configuration, a snap-in structure in which a distal end of the guide pin 41 can be inserted is formed.

The airbag module 3 includes, for example, an airbag (not shown) that is inflated and deployed in an emergency, an inflator 31 configured to supply gas to the airbag, a retainer 32 configured to support the airbag and the inflator 31, and a module cover 33 configured to cover an upper part of the retainer 32. Configurations of the inflator 31, the retainer 32, and the module cover 33 are not limited to having shapes shown in the drawings, and known configurations that are used in a related art can be freely applied.

As shown in FIGS. 2 and 3A, a recess 321 configured to accommodate a part of the horn switch 4 is formed in a bottom surface portion of the retainer 32, and the second opening 322 is formed at a bottom of the recess 321. As shown in FIG. 3A, the movable side contact point 47 is provided at a position facing the fixed side contact point 46 in a vicinity of the recess 321 in the bottom surface portion of the retainer 32. As shown in FIG. 2, the second opening 322 may be formed with a cutout portion 323 or a notch 324 configured to lock the protector 44.

As shown in FIG. 2, the guide pin 41 includes a reduced diameter portion 413 formed on a first end portion 411 side, and has an arrowhead shape or a hook shape. As shown in FIG. 3A, the reduced diameter portion 413 can accommodate the straight portion of the spring member 212 provided on the core metal 2. The reduced diameter portion 413 has an axial length a longer than a sliding distance of the guide pin 41 so as to be slidable in a state in which the spring member 212 is accommodated.

As shown in FIG. 2, the guide pin 41 includes an enlarged diameter portion 414 formed on a second end portion 412 side. The guide pin 41 is formed with an annular groove 416 formed in a shaft portion 415 between the reduced diameter portion 413 and the enlarged diameter portion 414. The groove 416 is capable of being locked with an inner edge 421e of the flange portion 421 of the stopper 42. The guide pin 41 may be formed with a lightening hole 417 for weight reduction.

As shown in FIG. 3A, the protector 44 is provided in the second opening 322 of the retainer 32. The protector 44 is an annular component including an enlarged diameter portion 441 provided on an upper surface of the second opening 322, a body portion 442 provided along the inner edge of the second opening 322, a claw portion 443 provided on the upper surface of the second opening 322, and a convex portion 444 configured to be locked in the notch 324 of the second opening 322.

By inserting the claw portion 443 into the cutout portion 323 formed in the second opening 322, and then rotating the claw portion 443, the protector 44 is fixed to the second opening 322 by sandwiching the inner edge of the second opening 322 with the claw portion 443 and the enlarged diameter portion 441. In this case, by locking the convex portion 444 in the notch 324, it is possible to position the protector 44 and to prevent unintended rotation of the protector 44 during use.

The protector 44 may include a plurality of protrusions 445 formed on a contact surface of the protector 44 with the damper 43. By forming the protrusions 445, it is possible to adjust a vibration frequency of the airbag module 3. The protrusions 445 are not limited to a shown shape and a shown arrangement.

The rubber damper 43 is provided inside the protector 44. As shown in FIGS. 2 and 3A, for example, the damper 43 has a substantially cylindrical shape including enlarged diameter portions 431, 432 at both end portions of the damper 43. By providing the damper 43 in the second opening 322 via the protector 44, it is possible to reduce wear of the damper 43 due to contact with the second opening 322. The guide pin 41 is inserted into a central part of the damper 43.

A back surface of an enlarged diameter portion 431 on an upper side of the damper 43 contacts the protrusions 445 formed on the enlarged diameter portion 441 of the protector 44. A surface of an enlarged diameter portion 432 on a lower side of the damper 43 contacts protrusions 425 formed on the flange portion 421 of the stopper 42.

As shown in FIGS. 2 and 3A, for example, the stopper 42 includes the flange portion 421, a cylindrical portion 422 extending from a lower surface of the flange portion 421 along an axial direction of the guide pin 41, and a cutout portion 423 that divides the flange portion 421 and the cylindrical portion 422 into a plurality of parts in a circumferential direction.

The inner edge 421e of the flange portion 421 protrudes inward of the cylindrical portion 422 and can be inserted into the groove 416 of the guide pin 41. An outer edge of the flange portion 421 may be formed with a plurality of convex portions 424 partially formed along an outer periphery. The convex portions 424 have a function of temporarily holding the horn spring 45 when the steering wheel 1 is assembled.

A contact surface (an upper surface in the drawing) of the flange portion 421 with the damper 43 may be formed with a plurality of protrusions 425. By forming the protrusions 425, it is possible to adjust the vibration frequency of the airbag module 3. The protrusions 425 are not limited to a shown shape and a shown arrangement.

As shown in FIG. 2, by forming the cutout portion 423 in the stopper 42, a flange portion 421 side can be widened in a radial direction. Therefore, after the guide pin 41 has been inserted into the cylindrical portion 422 in a state in which the inner edge 421e of the flange portion 421 is expanded to be larger than a diameter of the shaft portion 415 of the guide pin 41, the inner edge 421e of the flange portion 421 can be inserted into the groove 416 by narrowing the flange portion 421.

As shown in FIG. 3A, when the horn switch 4 is assembled, by inserting the cylindrical portion 422 into the first opening 211 formed in the core metal 2, a diameter of the flange portion 421 can be maintained so as not to be enlarged. Therefore, using the stopper 42, a state can be maintained in which the inner edge 421e of the flange portion 421 is accommodated in the groove 416.

As shown in FIG. 3A, the damper 43 and the protector 44 are provided in a space formed between the enlarged diameter portion 414 of the guide pin 41 and the flange portion 421 fitted into the guide pin 41. With this configuration, it is possible to lock the guide pin 41 in the second opening 322 of the retainer 32 via the stopper 42, the damper 43, and the protector 44, and to integrate the guide pin 41 and the retainer 32.

As shown in FIG. 3A, the horn spring 45 is provided in a space formed between the core metal 2 (the pedestal 21) and the flange portion 421. By providing the horn spring 45, it is possible to bias the flange portion 421 so as to lift the flange portion 421 upward.

Since the flange portion 421 is integrated with the retainer 32 via the guide pin 41, it is possible to bias the retainer 32 in a direction in which the retainer 32 is separated from the core metal 2 by a restoring force of the horn spring 45. Therefore, as shown in FIG. 3A, in a state in which the horn switch 4 is assembled, the movable side contact point 47 can be held in a state of being separated from the fixed side contact point 46.

When the airbag module 3 is pushed downward in a state shown in FIG. 3A, as the retainer 32 moves downward, the guide pin 41 and the stopper 42 slide downward along the first opening 211, and the flange portion 421 of the stopper 42 contracts the horn spring 45.

Then, as shown in FIG. 3B, the horn switch 4 operates when the movable side contact point 47 contacts the fixed side contact point 46. When a hand is released from the airbag module 3, the airbag module 3 is lifted upward by a restoring force of the horn spring 45, and the movable side contact point 47 is separated from the fixed side contact point 46.

According to the steering wheel 1 in the above-described present embodiment, since the guide pin 41 is locked to the airbag module 3 (the retainer 32) and is slidably provided on the core metal 2, it is possible to omit movable side and fixed side horn plates, and the guide pin 41 does not protrude toward the airbag module 3 when the horn switch 4 operates. Therefore, it is not necessary to secure these spaces.

By providing the stopper 42 on the shaft portion of the guide pin 41, a load applied when the airbag module 3 is pushed can be reliably transmitted to the horn spring 45 by the stopper 42. By providing the damper 43 between the airbag module 3 and the guide pin 41, the vibration frequency of the airbag module 3 can be adjusted by the damper 43.

Figure 4A:
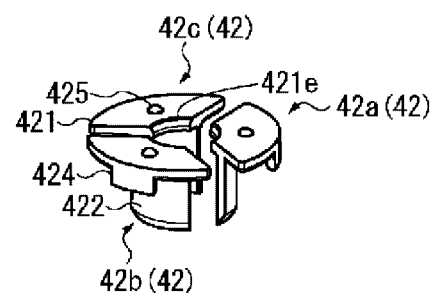
FIG. 4A is a view showing a first modification of a stopper.
Figure 4B:
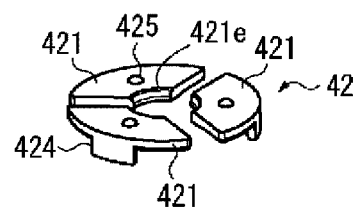
FIG. 4B is a view showing a second modification of the stopper.

Here, FIGS. 4A and 4B show modifications of a stopper, more specifically, FIG. 4A shows a first modification, and FIG. 4B shows a second modification. Components that are the same as those of the stopper 42 shown in FIG. 2 are denoted by the same reference numerals, and a repetitive description thereof will be omitted.

In the first modification shown in FIG. 4A, the stopper 42 includes divided pieces 42a to 42c obtained by dividing the flange portion 421 and the cylindrical portion 422 into a plurality of parts in a circumferential direction. As described above, even when the stopper 42 includes the divided pieces 42a to 42c, the stopper 42 can be fixed to the guide pin 41 by inserting the cylindrical portion 422 into the first opening 211 in a state in which the inner edge 421e of the flange portion 421 is inserted into the groove 416 of the guide pin 41.

In the second modification shown in FIG. 4B, the stopper 42 includes only the flange portion 421. For example, the stopper 42 according to the second modification can be formed by omitting the cylindrical portion 422 of the stopper 42 according to the first modification. For example, the cylindrical portion 422 can be omitted by press-fitting the flange portion 421 into the groove 416 of the guide pin 41 or by fixing the flange portion 421 with an adhesive or a fastener. Although not shown, the flange portion 421 may be formed in a ring shape and may be screwed into a spiral groove formed on an outer surface of the shaft portion 415 of the guide pin 41.

Figure 5A:
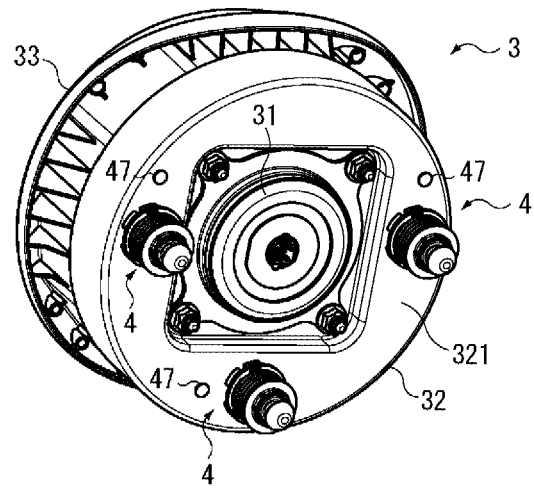
FIG. 5A is a view showing an airbag module of a steering wheel according to a second embodiment of the present invention.
Figure 5B:
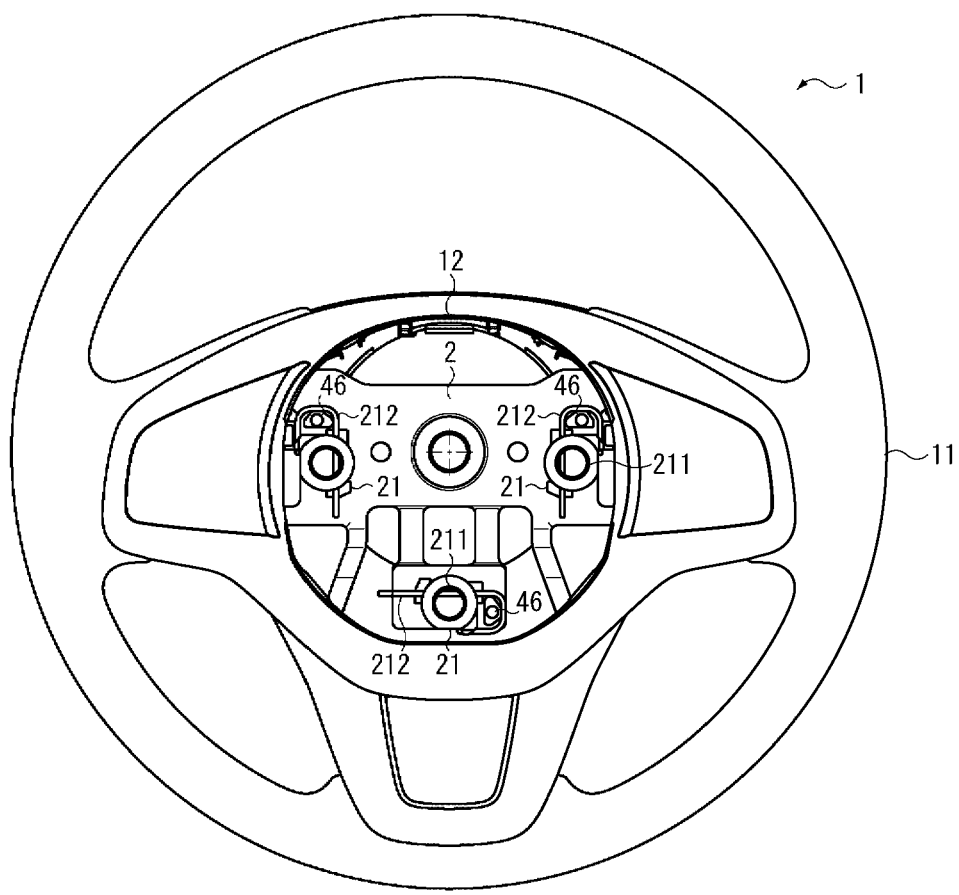
FIG. 5B is a view showing a steering wheel body of the steering wheel according to the second embodiment of the present invention.
Figure 6:
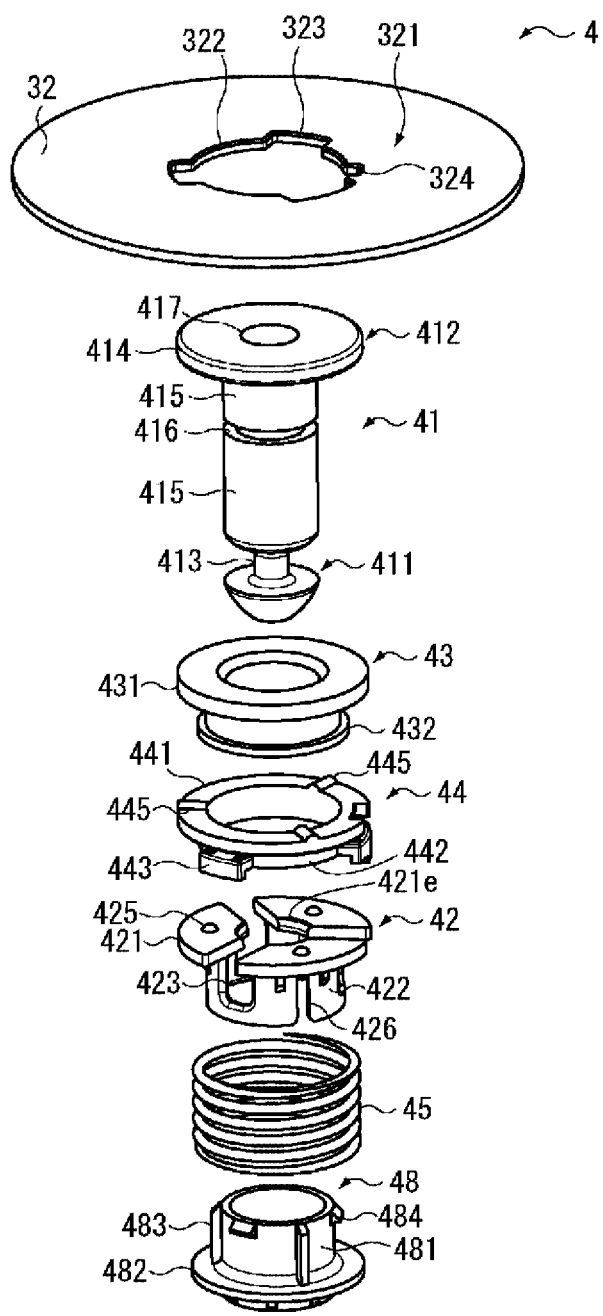
FIG. 6 is a component exploded view showing a horn switch shown in FIG. 5A.
Figure 7A:
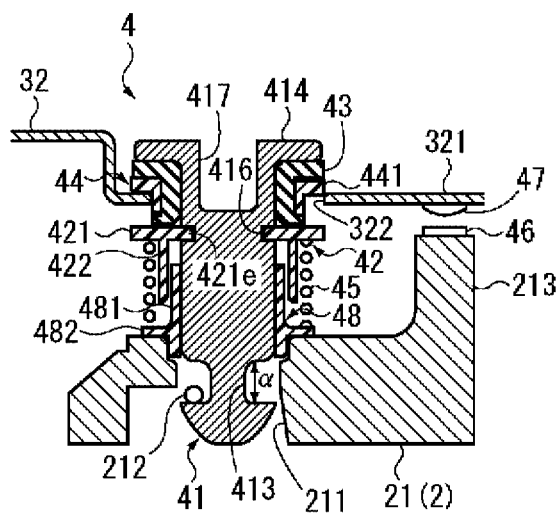
FIG. 7A is a cross-sectional view showing the horn switch shown in FIG. 5A in a normal state.
Figure 7B:
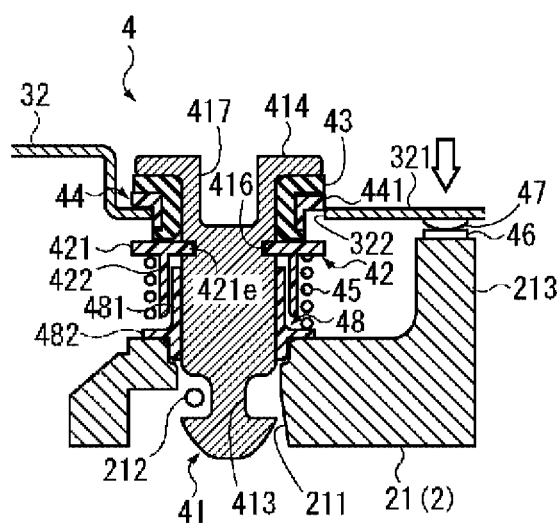
FIG. 7B is a cross-sectional view showing the horn switch shown in FIG. 5A in a horn operating state.

Next, the steering wheel 1 according to a second embodiment of the present invention will be described with reference to FIGS. 5A to 7B. Here, FIGS. 5A and 5B show the steering wheel according to the second embodiment of the present invention, more specifically, FIG. 5A shows an airbag module, and FIG. 5B shows a steering wheel body. FIG. 6 is a component exploded view showing a horn switch shown in FIG. 5A. FIGS. 7A and 7B are cross-sectional views showing the horn switch shown in FIG. 5A, more specifically, FIG. 7A shows a normal state of the horn switch, and FIG. 7B shows a horn operating state of the horn switch. Components that are the same as those of the steering wheel 1 according to the first embodiment are denoted by the same reference numerals, and a repetitive description thereof will be omitted.

The steering wheel 1 according to the second embodiment is different in a configuration of the spring member 212 provided on the pedestal 21 of the core metal 2. The spring member 212 according to the second embodiment is, for example, a bending spring bent into a J shape as shown in FIG. 5B. By restraining both end portions of the bending spring, a long straight portion can be elastically deformed in a horizontal direction.

When the spring member 212 is used, as shown in FIG. 7A, only one spring member 212 is accommodated in the reduced diameter portion 413 of the guide pin 41, so that the guide pin 41 has a cantilever support structure. In a case of this cantilever support structure, the guide pin 41 may be tilted with respect to the core metal 2.

Therefore, the horn switch 4 according to the present embodiment includes a substantially cylindrical guide sleeve 48 provided in the first opening 211. As shown in FIG. 6, for example, the guide sleeve 48 includes a shaft portion 481 whose lower end is inserted into the first opening 211, an enlarged diameter portion 482 formed on the shaft portion 481, a key 483 formed from the enlarged diameter portion 482 to an upper end, and a protrusion 484 that can be inserted into the cutout portion 423 of the stopper 42. The stopper 42 is formed with a key groove 426 into which the key 483 is inserted.

With this configuration, by inserting the key 483 of the guide sleeve 48 into the key groove 426 of the stopper 42 and inserting the protrusion 484 of the guide sleeve 48 into the cutout portion 423 of the stopper 42, it is possible to slidably couple the stopper 42 to the guide sleeve 48 in an axial direction. The protrusion 484 functions as a stopper for preventing the stopper 42 from coming off.

Then, as shown in FIG. 7A, by inserting a lower end of the guide sleeve 48 into the first opening 211 of the core metal 2 and bringing the enlarged diameter portion 482 into close contact with a surface of the core metal 2 (the pedestal 21), it is possible to provide the guide sleeve 48 vertically with respect to the first opening 211. Therefore, even when the guide pin 41 has a cantilever support structure, the guide sleeve 48 can prevent the guide pin 41 from tilting.

The present invention is not limited to the above-described embodiments, and various modifications may be made without departing from the spirit of the present invention. For example, the stopper 42 according to the second embodiment may include the divided pieces as shown in FIG. 4A, or may include only the flange portion as shown in FIG. 4B.

REFERENCE SIGNS LIST 1 steering wheel
2 core metal
3 airbag module
4 horn switch
11 steering wheel body
12 opening
21 pedestal
31 inflator
32 retainer
33 module cover
41 guide pin
42 stopper
42a to 42c divided piece
43 damper
44 protector
45 horn spring
46 fixed side contact point
47 movable side contact point
48 guide sleeve
211 first opening
212 spring member
213 convex portion
321 recess
322 second opening
323 cutout portion
324 notch
411 first end portion
412 second end portion
413 reduced diameter portion
414 enlarged diameter portion
415 shaft portion
416 groove
417 lightening hole
421 flange portion
421e inner edge
422 cylindrical portion
423 cutout portion
424 convex portion
425 protrusion
426 key groove
441 enlarged diameter portion
442 body portion
443 claw portion
444 convex portion
445 protrusion
481 shaft portion
482 enlarged diameter portion
483 key
484 protrusion

The invention claimed is:

1. A steering wheel configured to operate a steering angle of a vehicle, the steering wheel comprising:
a core metal as a skeleton of the steering wheel;
an airbag module provided on the steering wheel; and
a horn switch provided between the core metal and the airbag module,
wherein the horn switch includes
a guide pin including a first end portion that is axially slidably connected to a first opening provided in the core metal and a second end portion that is capable of being locked in a second opening provided in the airbag module, a stopper including a flange portion fixed to a shaft portion of the guide pin, a damper that is provided in a space between the second end portion and the flange portion and is locked to an inner edge of the second opening, a horn spring provided between the flange portion and the core metal, a fixed side contact point provided on the core metal, a movable side contact point provided on the airbag module, and a substantially cylindrical guide sleeve provided at the first opening to surround the guide pin so that the guide pin is movable through the substantially cylindrical guide sleeve, wherein the substantially cylindrical guide sleeve has an enlarged diameter portion whose lower surface is directly contacted with the core metal in an axial direction of the guide pin, and the enlarged diameter portion radially extends in a radial direction being orthogonal to the axial direction.

2. The steering wheel according to claim 1,
wherein the stopper includes a plurality of protrusions provided on a contact surface of the flange portion with the damper.

3. The steering wheel according to claim 1,
wherein the guide pin is provided with a groove that is capable of being locked with an inner edge of the flange portion, and the stopper includes a cylindrical portion that extends from a lower surface of the flange portion along the axial direction of the guide pin.

4. The steering wheel according to claim 3,
wherein the stopper is provided with a cutout portion that divides the flange portion and the cylindrical portion into a plurality of parts in a circumferential direction.

5. The steering wheel according to claim 3,
wherein the stopper includes divided pieces obtained by dividing the flange portion and the cylindrical portion into a plurality of parts in a circumferential direction.

6. The steering wheel according to claim 1,
wherein the horn switch further includes a protector provided between the second opening and the damper.

7. The steering wheel according to claim 6,
wherein the protector includes a plurality of protrusions provided on a contact surface of the protector with the damper.

8. The steering wheel according to claim 1,
wherein the guide pin includes a reduced diameter portion capable of accommodating a part of a spring member provided on the core metal, and the reduced diameter portion has the axial length larger than a sliding distance of the guide pin.

* * * * *